US005623314A

United States Patent [19]
Retter et al.

[11] Patent Number: 5,623,314
[45] Date of Patent: Apr. 22, 1997

[54] MPEG DECODER MEMORY DATA STORAGE AND TRANSFER

[75] Inventors: Refael Retter, Haifa; Moshe Bublil, Netanya; Gad Shavit, Givat Ella; Aharon Gill, Haifa, all of Israel

[73] Assignee: Zoran Microelectronics Ltd., Haifa, Israel

[21] Appl. No.: 245,740

[22] Filed: May 18, 1994

[51] Int. Cl.$^6$ ......................................................... H04N 7/26
[52] U.S. Cl. ............................................. 348/423; 348/714
[58] Field of Search ...................................... 348/423, 714, 348/715, 716, 717, 718, 719; H04N 7/133, 7/137, 7/26

[56] References Cited

U.S. PATENT DOCUMENTS 5,122,875  6/1992  Raychaudhuri ........................ 348/423

OTHER PUBLICATIONS

Grunin, Image Compression for PC Graphics, PC Magazine, vol. 11, No. 8, Apr. 28, 1992, pp. 337–350.
Leonard, Silicon Solution Merges Video, Stills, and Voice, Electronic Design, Apr. 2, 1992, pp. 45–54.
Product Hightlights, Video Compression Processor Handles Multiple Protocols, Electronic Products, Oct. 1991, pp. 85–86.
Wilson, One–Chip Video Engine, Electronic Engineering Times, Issue 659, Sep. 16, 1991, pp. 1, 8–9.
Preliminary Application Note, Using the IIT Vision Processor in JPEG Applications, Integrated Information Technology, Inc., Sep. 1991, pp. 1–15.
Preliminary Data Sheet, IIT Vision Processor—Single–Chip Microcode–Driven VSP for DCT–Based Algorithms, Integrated Information Technology, Inc., Sep. 1991, pp. 1–20.
Application Note, Video Compression Chip Set, LSI Logic Corporation, Sep. 27, 1990, pp. 1–16.
Tentative Data, ST13220 Motion Estimation Processor, SGS–Thomson Microelectronics, Jul. 1990, pp. 1–24.

*Primary Examiner*—Howard W. Britton
*Attorney, Agent, or Firm*—Townsend and Townsend and Crew LLP; Henry K. Woodward

[57] ABSTRACT

Data transfer and timing in an external DRAM memory of an MPEG decoder utilizes a repetitive pattern for synchronous writing and reading of data and data refresh including a sequence header at the beginning of a picture, a macroblock header for each of the macroblocks of a picture, and a plurality of repetitions of block decoding after each macroblock header decode.

7 Claims, 3 Drawing Sheets

| | | |
|---|---|---|
| MACRO BLOCK HEADER PATTERN. (393) | 42 | VIDEO CODE READ |
| | 123 | CODE WRITE |
| | 15 | SERIAL CODE DATA (1) READ |
| | 15 | SERIAL CODE DATA (2) WRITE |
| | 54 | REFRESH |
| | 75 | Y COMPONENT DATA READ FOR DISPLAY |
| | 69 | U/V COMPONENTS DATA READ FOR DISPLAY |
| BLOCK PATTERN (747) X6 | 39 | VIDEO CODE READ |
| | 189 | DECODED PICTURE READ FOR REFERENCE (1) |
| | 189 | DECODED PICTURE READ FOR REFERENCE (2) |
| | 144 | DECODED PICTURE WRITE |
| | 126 | Y COMPONENT DATA READ FOR DISPLAY |
| | 60 | U/V COMPONENTS DATA READ FOR DISPLAY |

FIG. 3

MPEG DECODER MEMORY DATA STORAGE AND TRANSFER

BACKGROUND OF THE INVENTION

This invention relates generally to the encoding and decoding of multimedia data, and more particularly the invention relates to a decoder of audio and video data which has been encoded in accordance with the MPEG (Motion Picture Experts Group) standard for full-motion video.

The MPEG decoding algorithm specifies several buffers for proper decoding. The first type of buffers are coded bitstream buffers. If the decoder decodes video only, then one coded bitstream buffer is needed. If the decoder decodes the multiplexed system bitstreams, then the number of coded bitstream buffers needed is equal to the number of bitstreams synchronized by the decoder. The second type of buffers are decoded picture buffers used as reference data in the decoding process. Two picture buffers are needed for this purpose. When the coded pictures are progressive (as in the case in MPEG 1 and some subsets of MPEG 2) and the decoder has to support conversion of the decoded picture to interlaced display, at least a third picture buffer is needed.

Even for constrained MPEG I video bitstreams, the size of the needed coded video bitstream buffer (typically about 40 Kbytes) and SIF size picture buffers (typically about 125 Kbytes per picture) preclude a cost effective solution that supports the needed buffers inside the decoder. An external buffer completely controlled by the decoder is a better solution.

Of the common types of RAM devices (SRAM, VRAM and DRAM), the DRAM offers the most cost effective solution and indeed many of the decoders already implemented use external DRAM buffers. The requirements of the DRAM structure and mapping of the various buffers to the DRAM address space are described in copending application Ser. No. 08/245,465 filed May 18, 1994 for DYNAMIC RANDOM ACCESS MEMORY FOR MPEG DECODING.

The DRAM has many "customers" within the decoder device (i.e., writing of the data into the various buffers as this data becomes available and reading the data of the various buffers, sometimes for different purposes, as the data is needed). The present invention is directed to the requirements of the DRAM and the MPEG decoding algorithm as to when and for how long to allocate the DRAM for each of its "customers".

To make the explanation easier, the term "slot" will be used, where a slot is a time period during which the DRAM is either written to or read from a specific buffer for a specific purpose.

Consider now MPEG and DRAM requirements as illustrated in FIG. 1. Most DRAMs have a special "page mode" read or write where consecutive transfer of cells within the same row is much faster (about three times typically) than a transfer of a random single cell. There is some overhead involved so that the larger the "page" (number of cells of the same row transferred consecutively), the smaller is the average time per transferred cell. A slot can contain more than one page.

On the other hand, if data is not written "just in time" after it becomes available, or not read "just in time" before it is needed, it will have to be stored temporarily in buffers on board the decoder device. The larger the delay, the larger the needed buffer.

Video coded data becomes available as it enters the decoder. The data can enter the decoder at a constant bit rate or by demand. It is needed before the decoding of each header and each sample block of each of the components. The amount of data needed by each header or block is variable. See FIG. 1 for an overview block diagram.

Serial coded data (audio or private) is available as it enters the decoder. The data can enter the decoder at a constant bit rate or by demand. It is needed in a constant bit rate expected by its receiver (and specified (for audio) in the coded bitstream).

A decoded picture is composed of three rectangular components: one (the Y component) is l lines by p samples by 8 bits, and the other two (the U and V components) are ½ line by p/2 samples by 8 bits. The pictures are written in 8*8 sample blocks as they are decoded. The order of decoding is by macroblocks which contain four Y blocks followed by one U block and then one V block. For some macroblocks, decoding requires reference data from one reference picture. For some macroblocks, decoding requires reference data from two reference pictures. The data needed for the decoding of each block of those macroblocks is one 9*9 sample block with origin at any sample of the component, from either one or both of the reference pictures.

On the average, the amount of coded data per block is decreasing as the number of reference pictures used (0, 1 or 2) is increasing. For display, each of the three picture buffers (or only two, as the case may be), is read in raster scan order. The data of all three components is usually needed in parallel. The DRAM requires a periodic refresh operation of each of its rows. This refresh is automatically done with each transfer operation. Otherwise, it requires a special operation.

SUMMARY OF THE INVENTION

In accordance with the invention, DRAM data storage, transfer and timing in an MPEG decoder is provided. There are two principal methods to allocate slots to write and read each type of data and the refresh operation. One is by demand (asynchronous method) and one is using a repetitive pattern (synchronous method). The "by demand" method can have better efficiency and utilize smaller decoder device buffers. But its management is a relatively complicated task which gets more complicated as its efficiency is increased. The "repetitive pattern" method is much simpler. If the second method can be used without requiring faster DRAMs, it is much more cost effective.

Since the refresh, serial coded data (e.g., coded audio) output and display (during the active parts of the display lines) operations have naturally a fixed rate (i.e., synchronous), the next issue to analyze is whether the DRAM transfers needed for decoding (i.e., the video code read, picture write and reference pictures(s) read operations) and the code write operation can also use a repetitive pattern. If the result of this analysis is positive (as is the case in the specific example of the next section), then the "repetitive pattern" method should be used. The invention is directed to the repetitive pattern method.

The video decoding has the following distinct tasks: Sequence header decoding, Group-of_Pictures header decoding, Picture header decoding, Slice header decoding, macroblock header decoding and block decoding. It is natural to lump these tasks into three tasks only, the first is Sequence header decoding, Group-of_Pictures header decoding and Picture header decoding; the second is Slice header decoding and Macroblock header decoding; and the third is block decoding.

The first task has to be executed once at the beginning of a picture. The second task has to be executed once at the beginning of a macroblock, and the third task 6 times per macroblock. This is a "repetitive pattern" that is the basis for the "repetitive pattern" of DRAM transfer and refresh.

The decoded picture data is available, and the reference picture data is needed (when needed) per block. Video coded data is needed for headers decoding and for block decoding.

The rest of the transfer types (code write, picture data read for display, serial coded data read for output and refresh) do not depend on the three tasks mentioned above, and there is a choice of how often to execute them (i.e., with first task, with the second task or with each block). The slot start timing requirements for refresh and the size of internal buffers vs. the length of each slot, show a cost effective compromise where code write, serial coded data read for output and refresh are executed with the second task, and picture data read for display is executed each block.

As a consequence, there is no need for a special pattern for the first task and only two patterns remain, that of the second task (which will be called macroblock header decoding even though it also includes Slice header decoding) and the third task of block decoding. The result is a macroblock pattern which is repeated continuously and which contains one macroblock header decoding pattern followed by 6 repetitions of the block decoding pattern, as shown in FIG. 2.

In some decoder cases, especially when flexible display sizes are supported, the picture period (specified in the video stream) is not a multiple of the macroblock pattern period. In order to reduce the "jitter" between the slots pattern and the picture period, when such a reduction may be needed for the application, a shortened macroblock pattern can be used, when no macroblocks are decoded, which includes the macroblock header decoding pattern only. In order not to reduce the bit rate of all transfers which are not related to macroblock decoding, picture data read for display slots should be included in the macroblock header decoding pattern.

Parts of the slot length may remain unused. The length allocated for each slot should take into account some margin to the loss of efficiency if it is possible that one of its pages will be terminated when its slot reaches the end of the DRAM row which means a beginning of a new page.

Some exceptions to the above guidelines may be needed to balance the time needed for the decoding task and the time needed for the DRAM transfers allocated to the pattern of this decoding task.

The transfer type of each slot in the pattern is fixed. A few exceptions to this guideline may help to balance the specific needs in some block types (e.g., allocating one or both of the reference picture data read slots, for blocks with one reference or block with no reference data, to the video code read); in macroblock header pattern (e.g., to allocate the serial coded data read slot to refresh); or in the macroblock patterns during picture header decoding (e.g., to allocate both reference picture data read and picture data write slots to code read).

The invention and objects and features thereof will be more readily apparent from the following detailed description and appended claims when taken with the drawings.

BRIEF DESCRIPTION OF THE DRAWINGS

FIG. 3 illustrates the order of the block decoding pattern.

DETAILED DESCRIPTION OF ILLUSTRATIVE EMBODIMENT

Figure 1:
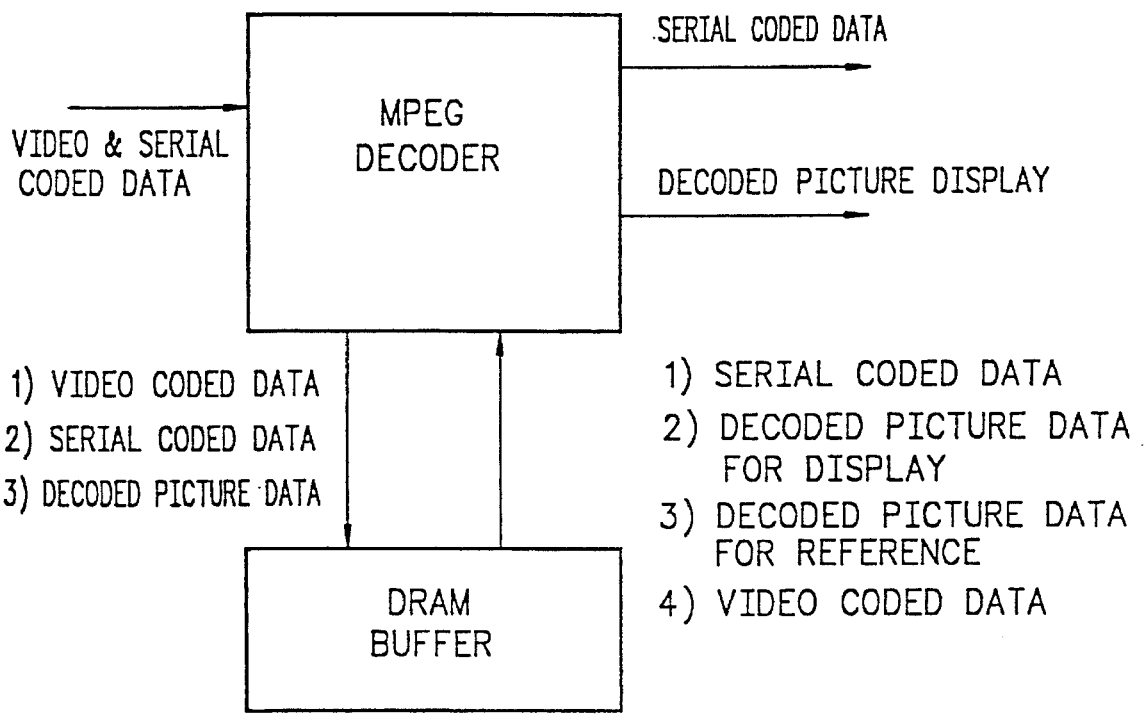
FIG. 1 illustrates an MPEG decoder with external DRAM memory.
Figure 2:
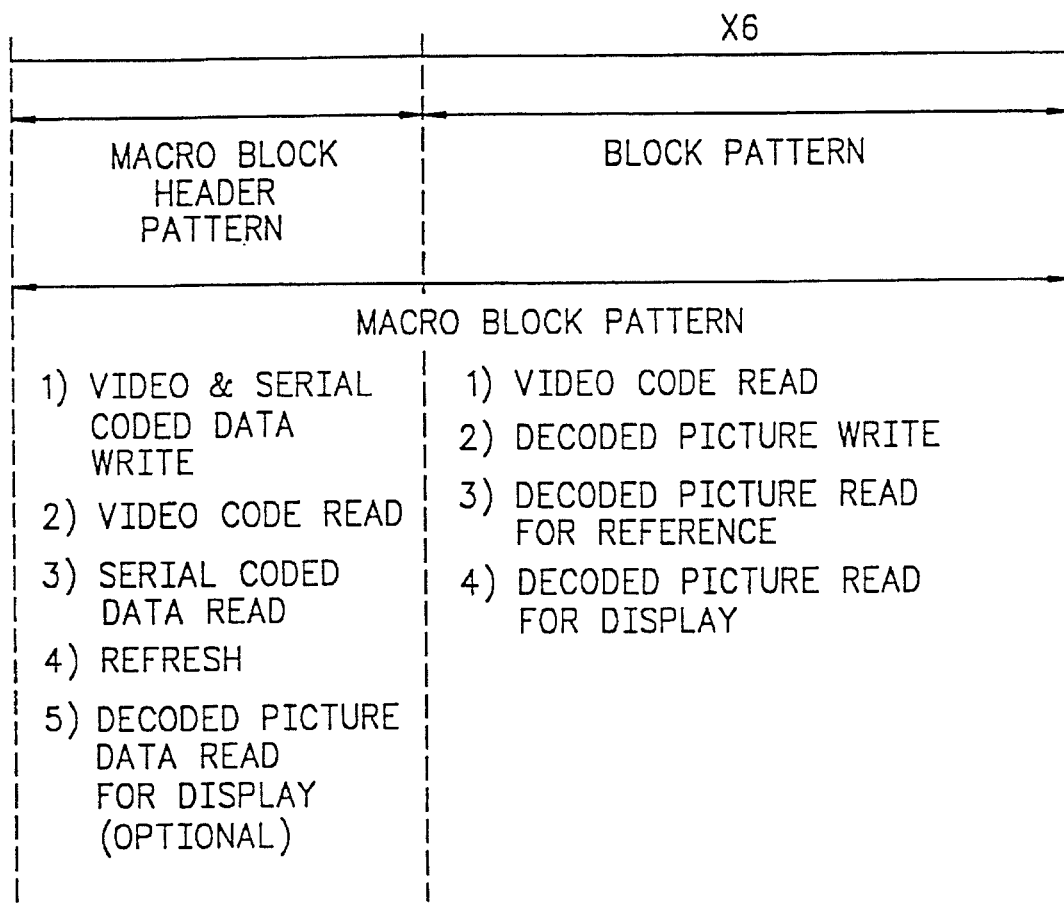
FIG. 2 illustrates a macroblock pattern in accordance with the invention.

Consider now a specific embodiment of an MPEG I system and video decoder that has to handle one video stream with picture size up to 352*288 and at least 46 Kbytes of code buffer, and two serial streams (audio or private) with at least 4 Kbytes buffer each. The device has to support interlaced output also.

The DRAM chosen for this example is a 4 Mbit device with 512*512*16 structure. (This is one of the examples of the first MPEG Decoder architecture in application Ser. No. 08/245,465, supra).

The following memory organization is used:

a) Each of the 4 Kbytes buffer will occupy 4 complete rows (of 512 cells times 16 bits).

b) The 46 Kbytes buffer will occupy 46 complete rows (of 512 cells times 16 bits).

c) Each of the Y component of the two reference pictures will occupy 288 rows with 176 consecutive cells (times 16 bits).

d) Each of the U or V component of the three pictures will occupy 144 rows with 88 consecutive cells (times 16 bits).

e) Unfortunately, the Y component of the 3rd picture cannot be organized in such a regular fashion and it has to occupy a non-rectangular region of the DRAM. In this example it is divided into three rectangles.

f) The proposed organization leaves some complete rows free. These rows can be allocated to the coded bitstream buffers.

In this specific embodiment, the time needed for page transfer overhead is 6 time units and the time needed for one transfer within a page is 3 time units. The time needed for refresh of one row is 9 time units. The time needed to decode a block takes 747 time units and the time needed to decode a macroblock header takes 393 time units.

Following the guidelines, the following slots are allocated in the macroblock header decoding period:

a) Refresh: 6 rows are refreshed taking 54 time units to support the 512 rows refresh every 8 mSec which is the requirement of the specific DRAM chosen.

b) Code write: 123 time units which entail 39 16 bit words transfers, if there is no page break, to support 5 Mbits/Sec which is the requirement of the ZR36100.

c) Serial coded data: 15 time units for each slot which entail 3 16-bit words transfers, if there is not page break, to support 0.5 Mbits/Sec. This is the requirement for each of the two serial streams in the ZR36100 MPEG decoder of Zoran Corporation, assignee.

d) Code read: 42 times units which entail 12 16-bit words transfers, if there is no page break, to support the code length needed for macroblock header decoding according to MPEG I (ISO 11172-2) standard specs.

These slots together take 249 units out of 393. To balance, and to reduce jitter, two picture data reads for display are added to the macroblock header decoding period:

e) Picture data read for display (Y component): 75 time units which entail 23 16-bit words transfers (46 samples), if there is no page break.

f) Picture data read for display (U or V component): 69 time units which entail 21 16-bit words transfers (42 samples), if there is no page break.

The following slots are allocated in the block decoding period:

a) First picture data read for reference: 9 page of 21 time units each (total of 189 time units) which entail 5 16-bit words transfers (10 samples of which one is discarded by the decoder). In this case, a page break cannot occur.

b) Second picture data read for reference: 9 pages of 21 time units each (total of 189 time units) which entail 5 16-bit words transfers (10 samples of which one is discarded by the decoder). In this case, a page break cannot occur.

c) Decoded picture data write: 8 pages of 18 time units each (total of 144 time units) which entail 4 16-bit words transfers (8 samples). In this case, a page break cannot occur.

d) Picture data read for display (Y component): 126 time units which entail 40 16-bit words transfers (80 samples), if there is no page break.

e) Picture data read for display (U or V component): 60 time units which entail 18 16-bit words transfers (36 samples), if there is no page break.

These slots together take 708 time units out of 747. The balance is allocated to the code read slot:

f) Code read: 39 time units which entail 11 16-bit words transfers, if there is no page break. This transfer rate is equivalent to 2.75 bits/sample.

The above code rate per block (176 bits) is sufficient for blocks with two references given the max video code rate specified for the ZR36100 (3 Mbits/Sec), but is not sufficient for blocks with only one reference, or with no reference. Reallocation of the picture data read for reference slots is used. For blocks with only one reference, one of the picture data read for reference slots is reallocated to code read. For blocks with no reference (or during picture header decoding), both of the picture data read for reference slots are reallocated to code read.

The order chosen for the slots put the two picture data read for reference slots adjacent to code read slot to maximize the available page length. For blocks with only one reference, the code read slot length is now 228 time units which entail 74 16-bit words transfers, if there is no page break, (transfer rate is equivalent to 18.5 bits/sample). For blocks with no reference, the code read slot length is now 417 time units which entail 137 16-bit words transfers, if there is no page break (transfer rate is equivalent to 34.25 bits/sample).

Another slot reallocation is used for fast search where serial coded data read slots are allocated to code write. In addition to the slot order consideration, the slot order is chosen to minimize the length of the buffers within the decoder into which the picture data is read from the DRAM for display and from which the decoded picture is written to the DRAM:

a) The order for the macroblock header decoding period is: Code read, code write, serial coded data (port 1) read, serial coded data (port 2) read, refresh, Y samples data read for display and U or V samples data read for display.

b) the order for the block decoding period as illustrated in FIG. 3 is: Code read, first picture data read for reference, second picture data read for reference, decoded picture data write, Y samples data read for display and U or V samples data read for display.

While the invention has been described with reference to a specific embodiment, the description is illustrative of the invention. Various modifications and applications may occur to those skilled in the art without departing from the true spirit and scope of the invention as defined by the appended claims.

What is claimed is:

1. In an MPEG decoder, a method of picture data transfer from a DRAM memory and processing comprising the steps of a) decoding a sequence header for each picture data having a plurality of macroblocks, b) decoding a macroblock header at the beginning of each macroblock, and c) executing a fixed plurality of repetitions of block decoding after each macroblock header decoding.

2. The method as defined by claim 1 wherein step (a) includes decoding a group of pictures header and picture header decoding.

3. The method as defined by claim 1 wherein step (a) is executed once at the beginning of a picture, step (b) is executed once at the beginning of a macroblock, and step (c) is executed repetitively six times per macroblock.

4. The method as defined by claim 1 where step c) includes video and serial coded data write, video code data read, serial code data read, and data refresh.

5. The method as defined by claim 2 where step c) further includes

Y component data read for display, and U/V components data read for display.

6. The method as defined by claim 1 wherein step (b) is executed in the following order:

code read, code write, serial coded data (port 1) read, serial coded data (port 2) read, refresh, Y samples data read for display and U or V samples data read for display.

7. The method as defined by claim 6 wherein step (c) is executed repetitively a plurality of times in the following order:

code read, first picture data read for reference, second picture data read for reference, decoded picture data write, Y samples data read for display and U or V samples data read for display.

* * * * *